United States Patent
Suh et al.

(10) Patent No.: US 9,712,804 B2
(45) Date of Patent: Jul. 18, 2017

(54) RECEIVING DEVICE AND METHOD FOR RECEIVING MULTIVIEW THREE-DIMENSIONAL BROADCAST SIGNAL

(75) Inventors: Jongyeul Suh, Seoul (KR); Jeehyun Choe, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 358 days.

(21) Appl. No.: 13/990,648

(22) PCT Filed: Dec. 2, 2011

(86) PCT No.: PCT/KR2011/009315
§ 371 (c)(1),
(2), (4) Date: May 30, 2013

(87) PCT Pub. No.: WO2012/074328
PCT Pub. Date: Jun. 7, 2012

(65) Prior Publication Data
US 2013/0250052 A1    Sep. 26, 2013

Related U.S. Application Data

(60) Provisional application No. 61/419,256, filed on Dec. 3, 2010.

(51) Int. Cl.
H04N 13/00    (2006.01)
H04N 21/488   (2011.01)
(Continued)

(52) U.S. Cl.
CPC ....... *H04N 13/007* (2013.01); *H04N 21/4884* (2013.01); *H04N 21/816* (2013.01); *H04N 2005/44526* (2013.01)

(58) Field of Classification Search
None
See application file for complete search history.

(56) References Cited

U.S. PATENT DOCUMENTS 6,104,425 A      8/2000 Kanno
2005/0114901 A1* 5/2005 Yui et al. ............... 725/100
(Continued)

FOREIGN PATENT DOCUMENTS

CN    101902582 A    12/2010
WO    2010/064118 A1  6/2010
(Continued)

*Primary Examiner* — Kevin McInnish
(74) *Attorney, Agent, or Firm* — Dentons US LLP

(57) ABSTRACT

A receiving device and a method for receiving a multiview three-dimensional broadcast signal, including a method for processing multiview three-dimensional broadcast signal having the steps of: receiving a broadcast signal, which includes a three-dimensional broadcast image for a plurality of views and includes signaling data for signaling the three-dimensional broadcast image; parsing three-dimensional broadcast image view information, parsing multiview subtitle stream packet identifier information, and parsing multiview subtitle segment identifier information; and outputting the three-dimensional broadcast image for the plurality of the views including the three-dimensional broadcast image of the particular view, to which the subtitle data is applied.

16 Claims, 19 Drawing Sheets

| Syntax | No. of bits | Format |
|---|---|---|
| Multiview_service_descriptor ( ) { | | |
| descriptor_tag | 8 | 0xTBD |
| descriptor_length | 8 | uimsbf |
| num_3D_views | 8 | uimsbf |
| camera_arrangement_type | 2 | uimsbf |
| reserved | 5 | bslbf |
| supported_angle_of_view_type | 1 | bslbf |
| supported_angle_of_view | 8 | uimsbf |
| camera_to_object_distance | 8 | uimsbf |
| } | | |

(51) Int. Cl.
*H04N 21/81* (2011.01)
*H04N 5/445* (2011.01)

(56) References Cited

U.S. PATENT DOCUMENTS

| | | | |
|---|---|---|---|
| 2009/0185616 A1* | 7/2009 | Pandit ................... | H04N 19/597 |
| | | | 375/240.01 |
| 2010/0074594 A1* | 3/2010 | Nakamura et al. ............. | 386/92 |
| 2010/0215343 A1* | 8/2010 | Ikeda ................... | G11B 27/034 |
| | | | 386/241 |
| 2011/0242296 A1* | 10/2011 | Ishihara et al. ................. | 348/54 |
| 2012/0092454 A1* | 4/2012 | Tourapis ............ | H04N 13/0003 |
| | | | 348/43 |

FOREIGN PATENT DOCUMENTS

| WO | WO 2010-087574 A2 | 8/2010 |
|---|---|---|
| WO | WO 2010-093115 A2 | 8/2010 |

* cited by examiner

FIG. 1

| Metadata elements | Description |
|---|---|
| Number of 3D views | Provided at program level – number of 3D views provided by 3D program |
| View ID | Provided in 3D view units – unique identification of each 3D view |
| Depth range | Provided in 3D view units – signifies minimum and maximum disparity of 3D image provided by each 3D view (or depth budget of each 3D view) |
| Left Camera ID | Provided in 3D view units  ID of camera acquiring data corresponding to left view image the generation process in 3D view (for the purpose of pinpointing camera location) - In order to pinpoint the exact physical location of the camera, intrinsic and extrinsic parameters of the corresponding camera are separately transmitted.) |
| Right Camera ID | Provided in 3D view units – ID of camera acquiring data corresponding to right view image the generation process in 3D view (for the purpose of pinpointing camera location) – In order to pinpoint the exact physical location of the camera, intrinsic and extrinsic parameters of the corresponding camera are separately transmitted.) |
| Caption/ Subtitle position & disparity | Available in 3D view units – location (or position) and disparity (depth) values of the caption/subtitle may vary depending upon the 3D view |

FIG. 3

| Number of 3D view = 3 | |
|---|---|
| View ID = 0 | Depth range = min_disp0 (near), max_disp0 (far) |
| | Subtitle/Caption disparity = disparity0(window 0), ...., disparity0(window n) |
| | Left Camera ID = 0 (Video 0) |
| | Right Camera ID = 1 (Video 1) |
| View ID = 1 | Depth range = min_disp1 (near), max_disp1 (far) |
| | Subtitle/Caption disparity = disparity1(window 0), ...., disparity1(window n) |
| | Left Camera ID = 1 (Video 1) |
| | Right Camera ID = 1 (Video 1) |
| View ID = 2 | Depth range = min_disp2 (near), max_disp2 (far) |
| | Subtitle/Caption disparity = disparity2(window 0), ...., disparity2(window n) |
| | Left Camera ID = 2 (Video 2) |
| | Right Camera ID = 3 (Video 3) |

FIG. 8

| Syntax | No. of bits | Format |
|---|---|---|
| Multiview_descriptor ( ) { | | |
|     descriptor_tag | 8 | 0xTBD |
|     descriptor_length | 8 | uimsbf |
|     num_3D_views | 8 | uimsbf |
|     camera_arrangement_type | 2 | uimsbf |
|     reserved | 5 | bslbf |
|     supported_angle_of_view_type | 1 | bslbf |
|     supported_angle_of_view | 8 | uimsbf |
|     camera_to_object_distance | 8 | uimsbf |
|     for (k=0; k < num_3D_views; k++) { | | |
|         3D_view_ID | 8 | uimsbf |
|         3D_view_priority | 8 | uimsbf |
|         left_PID | 13 | uimsbf |
|         right_PID | 13 | uimsbf |
|         reserved | 6 | bslbf |
|         left_cam_ID (component_tag) | 8 | uimsbf |
|         right_cam_ID (component_tag) | 8 | uimsbf |
|         left_cam_position | 8 | simsbf |
|         right_cam_position | 8 | simsbf |
|         min_disparity | 8 | simsbf |
|         max_disparity | 8 | simsbf |
|     } | | |
| } | | |

FIG. 9

| Syntax | No. of bits | Format |
|---|---|---|
| Multiview_service_descriptor ( ) { | | |
| descriptor_tag | 8 | 0xTBD |
| descriptor_length | 8 | uimsbf |
| num_3D_views | 8 | uimsbf |
| camera_arrangement_type | 2 | uimsbf |
| reserved | 5 | bslbf |
| supported_angle_of_view_type | 1 | bslbf |
| supported_angle_of_view | 8 | uimsbf |
| camera_to_object_distance | 8 | uimsbf |
| } | | |

FIG. 10

| Syntax | No. of bits | Format |
|---|---|---|
| Multiview_element_descriptor ( ) { | | |
|    descriptor_tag | 8 | 0xTBD |
|    descriptor_length | 8 | uimsbf |
|    camera_ID | 8 | uimsbf |
|    camera_position | 8 | simsbf |
|    reserved | 5 | bslbf |
|    number_3D_views | 3 | uimsbf |
|    for (i=0; i<num_3D_views; i++) { | | |
|       3D_view_ID | 8 | uimsbf |
|       3D_view_priority | 8 | uimsbf |
|       left_right_view | 1 | uimsbf |
|       reserved | 7 | bslbf |
|       other_camera_ID | 8 | uimsbf |
|       min_disparity | 8 | simsbf |
|       max_disparity | 8 | simsbf |
| } | | |

FIG. 11

| Syntax | No. of bits | Format |
|---|---|---|
| Multiview_subtitle_descriptor ( ) { | | |
|     descriptor_tag | 8 | 0xTBD |
|     descriptor_length | 8 | uimsbf |
|     num_3D_views | 8 | uimsbf |
|     for (k=0; k < num_3D_views; k--) { | | |
|         3D_view_ID | 8 | uimsbf |
|         3D_view_priority | 8 | uimsbf |
|         reserved | 5 | bslbf |
|         multiview_subtitle_type | 3 | uimsbf |
|         if(multiview_subtitle_type!='000') { | | |
|             reserved | 3 | bslbf |
|             new_subtitle_stream_PID | 13 | uimsbf |
|             new_subtitle_segment_type | 8 | uimsbf |
|         } | | |
|     } | | |
| } | | |

FIG. 12

| Syntax | No. of bits | Format |
|---|---|---|
| Multiview_caption_descriptor ( ) { | | |
|     descriptor_tag | 8 | 0xTBD |
|     descriptor_length | 8 | uimsbf |
|     num_3D_views | 8 | uimsbf |
|     for (k=0; k < num_3D_views; k--) { | | |
|         3D_view_ID | 8 | uimsbf |
|         3D_view_priority | 8 | uimsbf |
|         reserved | 2 | bslbf |
|         caption_service_number | 6 | uimsbf |
|     } | | |
| } | | |

RECEIVING DEVICE AND METHOD FOR RECEIVING MULTIVIEW THREE-DIMENSIONAL BROADCAST SIGNAL

FIELD OF THE INVENTION

The present invention relates to a method and device for receiving a multiview 3D (3-dimensional) broadcast signal.

More particularly, the present invention presents to a method and device for processing a subtitle, caption, and/or OSD (On Screen Display) respective to each view in a broadcast receiving environment providing multiview 3D images along with a 3D broadcast image.

BACKGROUND ART

As 3-Dimensional Television (3DTV) is being extensively provided, not only the supply of 3-dimensional (3D) image contents via storage medium but also the transmission of 3D image contents via digital broadcasting are being actively performed.

Generally, a 3-dimensional (3D) image provides a cubic effect by using the principles of stereoscopic vision of both human eyes. A human being (or individual) senses perspective through a parallax between both eyes, in other words, a binocular parallax caused by the two eyes of an individual being spaced apart at a distance of approximately 65 mm. Therefore, a 3D image may provide a cubic effect and perspective by providing an image enabling and a flat image associated with both the left eye and the right eye to be viewed.

Methods for displaying such 3D image include a stereoscopic method, a volumetric method, a holographic method, and so on. In case of the stereoscopic method, a left view image that is to be viewed by the left eye and a right view image that is to be viewed by the right eye are provided, and each of the left eye and the right eye respectively views the left view image and the right view image through polarized glasses or through a display equipment, thereby enabling the viewer to acknowledge the 3D effect.

Meanwhile, a 3D broadcast image should be provided to the viewer through a broadcast receiver to best fit the intentions of its producer (or designer). However, in the broadcast receiver, depending upon the position of the viewer viewing the broadcast, or depending upon display contents other than the broadcast image, such as subtitles and/or caption, the 3D image may be shown to the viewer as a 3D image different from the content intended by the producer.

DETAILED DESCRIPTION OF THE INVENTION

Technical Objects

In order to resolve the above-described problems, a technical object that is to be achieved by the present invention is to allow the viewer viewing a 3D broadcast image to use a broadcast receiver, so as to view the 3D image as intended by its producer regardless of the position at which the viewer is viewing the broadcast.

Another technical object that is to be achieved by the present invention is to prevent the OSD, subtitle, and/or caption that are being displayed along with the 3D image from causing distortion in the 3D image.

Technical Solutions

In order to achieve the above-described technical object, a method for processing a multiview 3-dimensional (3D) broadcast image according to an exemplary embodiment of the present invention may include a step of receiving a broadcast signal, wherein the broadcast signal includes a 3D broadcast image respective to multiple views, and wherein the broadcast signal includes signaling data for signaling the 3D broadcast image, a step of parsing 3D broadcast image view information identifying a 3D broadcast image of a specific view from a multiview subtitle descriptor for signaling subtitle data respective to multiple views, the 3D broadcast image view information being included in the signaling data, parsing multiview subtitle stream packet identifier information designating a packet identifier of a broadcast stream transmitting subtitle data for the 3D broadcast image of a specific view, the 3D broadcast image being identified by the 3D broadcast image view information, and parsing multiview subtitle segment identifier information identifying a segment transmitting subtitle data for a 3D broadcast image of a specific view, the subtitle data being included in a broadcast stream being identified by the multiview subtitle stream packet identifier, a step of applying the subtitle data of a segment identified by the multiview subtitle segment identifier information to a 3D broadcast image of a specific view having a same value as the 3D broadcast image view information, and a step of outputting a 3D broadcast image respective to multiple views, the 3D broadcast image including a 3D broadcast image of a specific view having the subtitle data applied thereto.

Preferably, the method may further include a step of parsing multiview subtitle attribute information indicating characteristics of subtitle data being applied to a 3D broadcast image of a specific view, the multiview subtitle characteristic information being included in the multiview subtitle descriptor, and, herein, the multiview subtitle characteristic information may indicate at least any one of the characteristics including a characteristic of subtitle data applied to the 3D broadcast image being added to subtitle data for a 2-dimensional (2D) broadcast image, thereby being used; a characteristic of subtitle data applied to the 3D broadcast image replacing a portion of subtitle data for the 2D broadcast image, thereby being used; and a characteristic of subtitle data applied to the 3D broadcast image replacing the subtitle data for the 2D broadcast image, thereby being used.

Preferably, the multiview subtitle descriptor may be included in a Program Map Table (PMT), a Virtual Channel Table (VCT), or a Service Description Table (SDT).

Preferably, the method may further include a step of parsing maximum disparity information indicating a greatest disparity value for a 3D broadcast image respective to each view and minimum disparity information indicating a lowest disparity value for a 3D broadcast image respective to each view, the maximum disparity information and the minimum disparity information being included in the 3D broadcast image respective to the multiple views.

Preferably, the method may further include a step of calculating an OSD disparity value for displaying an OSD (On Screen Display) in the 3D broadcast image respective to each view.

Preferably, the OSD disparity value may be calculated by selecting a smallest disparity value among the disparity values indicating minimum disparity information of the 3D broadcast image respective to each view.

Additionally, according to another exemplary embodiment of the present invention, a multiview 3D broadcast receiver may include a device performing the above-described method.

Effects of the Invention

According to the present invention, a viewer may be provided with a multiview 3D image service having a volumetric effect intended by its producer through a broadcast network.

According to the present invention, OSD, subtitles, and/or caption may be displayed along with 3D images, regardless of the viewers location (or position) or viewpoint of the 3D image, without having to cause any distortion in the 3D image.

BRIEF DESCRIPTION OF THE DRAWINGS

FIG. 1 illustrates metadata for OSD, subtitle, and/or caption services in a multiview 3D image broadcasting according to an exemplary embodiment of the present invention.

FIG. 3 illustrates metadata that are used for realizing video/graphic (OSD)/subtitle/caption output in the multiview 3D image according to the exemplary embodiment of the present invention.

FIG. 8 illustrates detailed information being included a Multiview_descriptor according to an exemplary embodiment of the present invention.

FIG. 9 illustrates a Multiview_service_descriptor according to an exemplary embodiment of the present invention.

FIG. 10 illustrates a Multiview_element_descriptor according to an exemplary embodiment of the present invention.

FIG. 11 illustrates a Multiview_subtitle_descriptor according to an exemplary embodiment of the present invention.

FIG. 12 illustrates a Multiview_caption_descriptor according to an exemplary embodiment of the present invention.

BEST MODE FOR CARRYING OUT THE PRESENT INVENTION

Figure 2:
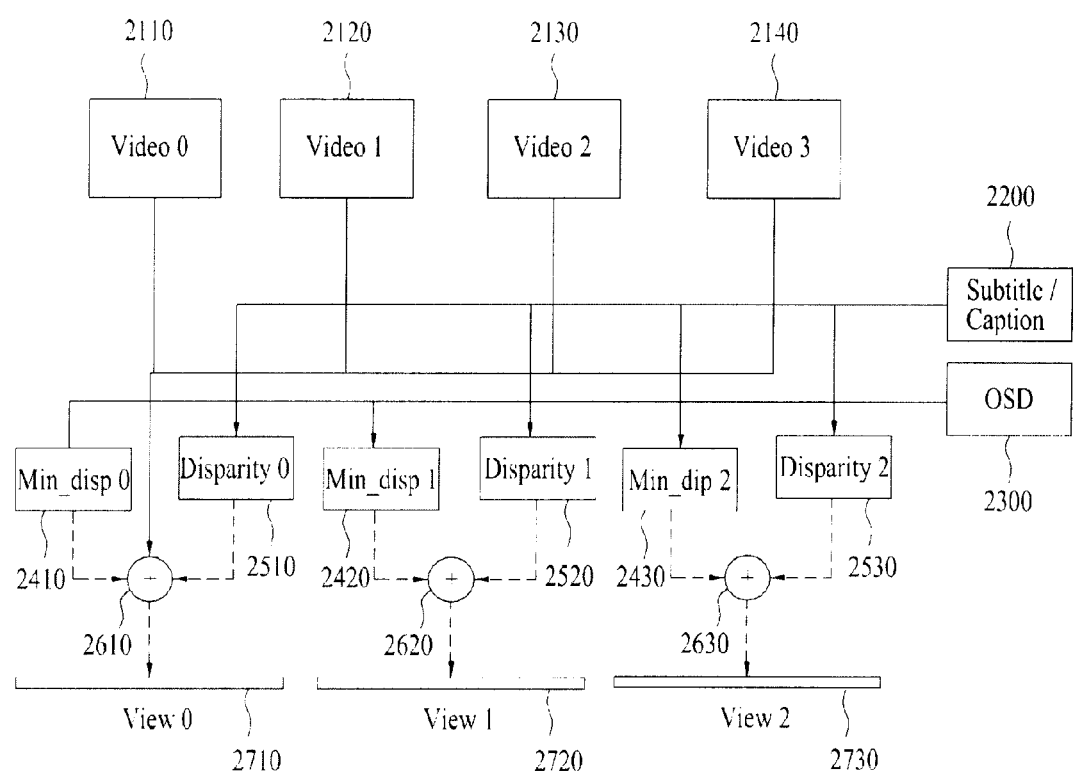
FIG. 2 illustrates a block realizing video/graphic (OSD)/subtitle/caption output in a multiview 3D image according to the exemplary embodiment of the present invention.

The preferred embodiments of the present invention will now be described in detail with reference to the accompanying drawings and the details given in the accompanying drawings. However, the present invention will not be limited only to the preferred embodiments described herein.

Although the terms used in the present invention are selected from generally known and used terms, some of the terms mentioned in the description of the present invention may be varied by anyone skilled in the art at his or her discretion, according to custom, or due to the advent of new technologies. Also, in some cases, some of the terms mentioned in the description of the present invention have been selected by the applicant at his or her discretion. And, in these cases, the detailed meanings are described in relevant parts of the description presented herein. Therefore, it is required that the terms used in the description of the present invention is understood not simply by the mere naming of the terms used herein but by the actual meaning of each term lying within and, also, based upon the overall content of the description of the present invention.

3D image presentation methods include a stereoscopic image method, which takes into account two perspectives (or viewpoints), and a multiple view image method (or multiview method), which takes into account three or more perspectives (or viewpoints). Conversely, the related art single view image type may be referred to as a monoscopic method.

A stereoscopic image method uses a pair of left view image and right view image acquired by photographing the same subject with a left-side camera and a right-side camera, wherein both cameras are spaced apart from one another at a predetermined distance. A multi-view image uses a set of at least 3 images acquired by photographing with at least 3 different cameras either spaced apart from one another at predetermined distances or placed at different angles.

The multiview 3D image, which will hereinafter be described, may be provided to the viewer by selecting 2 images being included in the 3D image of each view (or viewpoint) among the above-described 3 or more images, which are provided to the viewer as a 3D image from multiple viewpoints. This is referred to as a 3D image service and will hereinafter be used to have the same meaning as a multiview service.

FIG. 1 illustrates metadata for OSD, subtitle, and/or caption services in a multiview 3D image broadcasting according to an exemplary embodiment of the present invention.

Referring to FIG. 1, the metadata for OSD, subtitle, and/or caption services in multiview 3D image broadcasting according to the exemplary embodiment of the present invention may include a Number of 3D views element, a View ID element, a Depth range element, a Left Camera ID element, a Right Camera ID element, and/or Caption/Subtitle position & disparity element.

The Number of 3D is provided from a program level and signifies a number of 3D views being provided by a 3D image program.

The View ID element is provided in 3D view (or viewpoint) units and represents a unique identifier respective to each 3D view.

The Depth range element views element is provided in 3D view (or viewpoint) units and indicates minimum and maximum disparity between the 3D stereoscopic images provided from each 3D view. Alternatively, this element indicates a depth budget of each 3D view. According to the exemplary embodiment of the present invention, the disparity may be defined to represent a difference in a horizontal position of pixels expressing the same point in each of the left view image and the right view image, which are included in the 3D image. For example, as the disparity value becomes greater, the 3D object seems to be located further away from the viewer, and, as the disparity value becomes smaller, the 3D object seems to be located closer toward the viewer.

The Left Camera ID element is provided in 3D view (or viewpoint) units and signifies an identifier (ID) of a camera, which acquires data corresponding to the left view image during a process of creating a 3D view. The purpose of this element is to pinpoint the location of the camera, and, in order to pinpoint an accurate physical location of the respective camera, this element may separately transmit intrinsic and extrinsic parameters respective to the corresponding camera.

The Right Camera ID element is provided in 3D view (or viewpoint) units and signifies an identifier (ID) of a camera, which acquires data corresponding to the right view image during a process of creating a 3D view. The purpose of this element is to pinpoint the location of the camera, and, in order to pinpoint an accurate physical location of the respective camera, this element may separately transmit intrinsic and extrinsic parameters respective to the corresponding camera.

The Caption/Subtitle position & disparity element may be provided in 3D view (3D image view) units, and this element may have position and disparity (depth) values of another caption/subtitle with respect to each 3D image view.

The metadata sets shown in FIG. 1 may be processed to an adequate format to a related section data in accordance with a broadcast service (ATSC or DVB).

FIG. 2 illustrates a block realizing video/graphic (OSD)/subtitle/caption output in a multiview 3D image according to the exemplary embodiment of the present invention.

The realization of the multiview 3D image according to the exemplary embodiment of the present invention may be performed by a procedure including video sources (2110, 2120, 2130, 2140), a subtitle/caption source (2200), an OSD source (2300), minimum disparity information (2410, 2420, 2430), subtitle/caption disparity information (2510, 2520, 2530), 3D image formatter (2610, 2620, 2630), and/or specific view images (2710, 2720, 2730).

The video sources (2110, 2120, 2130, 2140) represent videos being acquired by cameras filming (or recording) 3D images. For the multiview 3D image, a procedure of combining images acquired from multiple cameras is required.

The subtitle/caption source (2200) may be configured in an image or text format, unlike the video image. For example, the subtitle may be configured as an image, and, since the need for a depth difference in the subtitle itself is not very significant, by providing disparity information respective to the subtitle itself, the 3D effect may be gained by displaying the same subtitles at position intervals corresponding to the disparity value of the left/right view images. This is similarly applied to captions, which may be configured of text.

Since the OSD source (2300) is generated and displayed from the broadcast receiver, the OSD source (2300) may generally be configured of a source respective to a reference standard, which is decided by the producer (or designer) of the broadcast receiver. In order to display an OSD while the 3D image is being provided, a depth correlation within the 3D image should be taken into consideration.

The minimum disparity information (2410, 2420, 2430) performs the function of deciding a depth range according to which the OSD is to be displayed. For example, in a 3D image of a specific view, within the range of a depth having 3D effect, the OSD may be set to be displayed to seem closer to the viewer than the 3D effect that seems to be most approximate to the viewer.

The subtitle/caption disparity information (2510, 2520, 2530) may be used as information indicating a depth level according to which the subtitle/caption should be displayed with respect to each view.

The 3D image formatter (2610, 2620, 2630) performs the function of formatting an OSD, which is based upon a video source and a minimum disparity information, and/or a subtitle/caption, which is based upon subtitle/caption disparity information, to a 3D image.

The specific view images (2710, 2720, 2730) respectively indicate images formatted from 3D image formatters (2610, 2620, 2630) to 3D images respective to each view. For example, when it is assumed that Video 0 (2110), Video 1 (2120), Video 2 (2130), Video 3 (2140) correspond to video sources recorded from neighboring (or adjacent) cameras by the numeric order, by formatting Video 0 and Video 1 along with the subtitle/caption and/or OSD, a 3D image respective to the first view, which is referred to as View 0, may be generated. Additionally, by formatting Video 1 and Video 2 along with the subtitle/caption and/or OSD, a 3D image respective to the second view, which is referred to as View 1, may be generated. And, similarly, by formatting Video 2 and Video 3 along with the subtitle/caption and/or OSD, a 3D image respective to the third view, which is referred to as View 2, may be generated.

FIG. 3 illustrates metadata that are used for realizing video/graphic (OSD)/subtitle/caption output in the multiview 3D image according to the exemplary embodiment of the present invention.

The metadata of FIG. 3 will hereinafter be described in detail by applying the metadata of FIG. 3 to the process of realizing a 3D image shown in FIG. 2.

In FIG. 2, 3D images respective to 3 different views were generated. This was expressed by an element referred to as Number of 3D views. And, by assigning the value of 3 to the corresponding element, information indicating the presence of 3D images respective to 3 different views may be signaled.

The 3D image respective to a view, which is expressed to have a View ID of 0, is expressed as View 0 (2710) of FIG. 2, and the 3D image respective to this view has a minimum disparity value (3D effect being expressed to seem most approximate to the viewer) of min_disp0 and a maximum disparity value (3D effect being expressed to seem most further away from the viewer) of max_disp0. Additionally, with respect to the subtitle/caption, a value of disparity0 is applied to each subtitle/caption window. The left view image configuring View 0 (2710) is acquired from Video 0 (2110), and the right view image is acquired from Video 1 (2120).

The 3D image respective to a view, which is expressed to have a View ID of 1, is expressed as View 1 (2720) of FIG. 2, and the 3D image respective to this view has a minimum disparity value (3D effect being expressed to seem most approximate to the viewer) of min_disp1 and a maximum disparity value (3D effect being expressed to seem most further away from the viewer) of max_disp1. Additionally, with respect to the subtitle/caption, a value of disparity 1 is applied to each subtitle/caption window. The left view image configuring View 1 (2720) is acquired from Video 1 (2120), and the right view image is acquired from Video 2 (2130).

The 3D image respective to a view, which is expressed to have a View ID of 2, is expressed as View 2 (2730) of FIG. 2, and the 3D image respective to this view has a minimum disparity value (3D effect being expressed to seem most approximate to the viewer) of min_disp2 and a maximum disparity value (3D effect being expressed to seem most further away from the viewer) of max_disp2. Additionally, with respect to the subtitle/caption, a value of disparity2 is applied to each subtitle/caption window. The left view image configuring View 2 (2730) is acquired from Video 2 (2130), and the right view image is acquired from Video 3 (2140).

Figure 4:
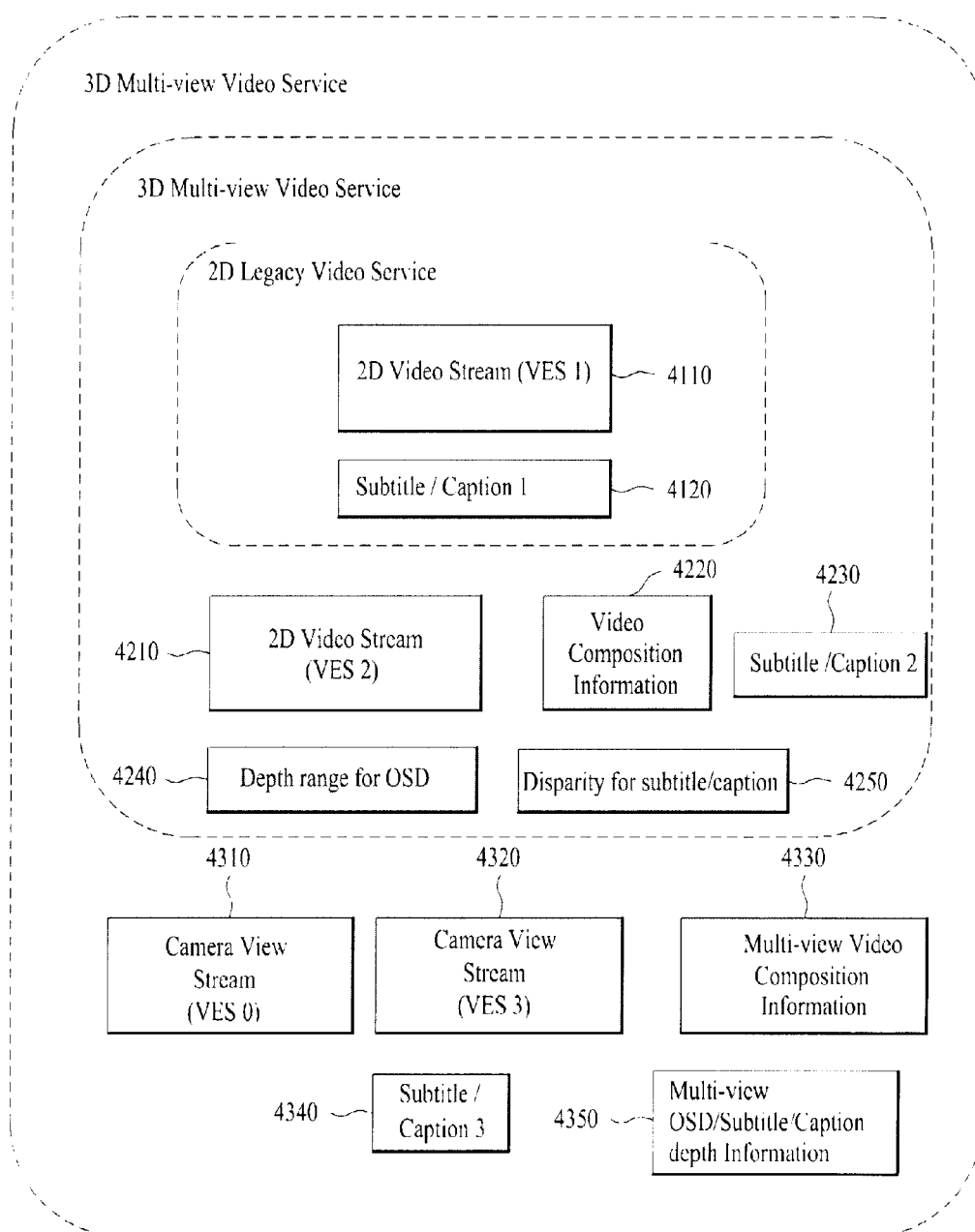
FIG. 4 illustrates an element configuring a multiview 3D service according to an exemplary embodiment of the present invention.

FIG. 4 illustrates an element configuring a multiview 3D service according to an exemplary embodiment of the present invention.

According to the exemplary embodiment of the present invention, the multiview 3D service may include a 2-dimensional (2D) video stream 1 (4110; VES1), subtitle/caption 1 (4120), 2D video stream 2 (4210; VES2), video composition information (4220), subtitle/caption 2 (4230), OSD depth range (4240), subtitle/caption disparity (4250), camera view stream 0 (4310; VES 0), camera view stream 3 (4320; VES 3), multiview video composition information (4330), subtitle/caption 3 (4340), and/or multiview OSD/subtitle/caption depth information (4350).

A 2D legacy video service may include the 2D video stream 1 (4110; VES1) and/or the subtitle/caption 1 (4120).

The 2D video stream 1 (4110; VES1) represents a stream that is compatible to a 2D service. More specifically, the 2D video stream 1 corresponds to a video element that can also be viewed by the conventional 2D broadcast receiver.

The subtitle/caption 1 (4120) corresponds to a subtitle/caption stream that is connected (or linked) with the 2D video stream, and this stream may be normally decoded by the 2D broadcast receiver.

A 3D stereoscopic video service may include the above-described 2D video stream 2 (4210; VES2), video composition information (4220), subtitle/caption 2 (4230), OSD depth range (4240), and subtitle/caption disparity (4250).

The 2D video stream 2 (4210; VES2) corresponds to another video stream configuring a 3D stereoscopic video service along with the VES 1 stream. For example, VES 1 may be used as a left view image of the 3D stereoscopic image, and VES 2 may be used as a right view image of the 3D stereoscopic image, and vice versa.

The video composition information (4220) notifies configuration information of the two video streams (VES 1, VES2), which configure a 3D stereoscopic video service. For example, the video composition information (4220) may include information notifying which of VES 1 and VES2 corresponds to the left view image or the right view image and information identifying any one of VES 1 and VES2 as a main image or a sub image.

The subtitle/caption 2 (4230) corresponds to subtitle/caption data that can be additionally provided with respect to the 3D stereoscopic video service.

The OSD depth range (4240) provides depth range information of a stereoscopic image, which is configured of VES1 and VES2. This corresponds to information that can be referred to when realizing a graphic function, such as OSD, and so on, in the broadcast receiver. For example, the broadcast receiver may adjust the display depth of the OSD, so that the OSD can be displayed outside of the above-described depth range, thereby preventing the OSD from colliding with an object of the 3D image.

The subtitle/caption disparity (4250) corresponds to information for assigning 3D coordinates respective to the subtitle/caption data in the 3D broadcast service. More specifically, the subtitle/caption disparity (4250) may include a disparity value indicating a horizontal location (or position) difference in the left view image/right view image of the subtitle/caption, which is provided by the 3D broadcast service. Such disparity information may be added to the subtitle/caption 1 (4120), so as to realize stereoscopic subtitles.

A multiview 3D video service may include the 3D stereoscopic video service, camera view stream 0 (4310; VES 0), camera view stream 3 (4320; VES 3), multiview video composition information (4330), subtitle/caption 3 (4340), and/or multiview OSD/subtitle/caption depth information (4350).

The camera view stream 0 (4310; VES 0) and the camera view stream 3 (4320; VES 3) correspond to video streams configuring a 3D Multi-view video service along with the VES 1 and VES2 streams. Herein, the multiview 3D video service may be considered as a concept of a group of multiple stereoscopic services. The 3D video of each view corresponds to a stereoscopic service respectively using each of the two video streams as left/right video streams.

The multiview video composition information (4330) includes information on a combination of each video configuring the multiview service and information on the 3D image of each view. For example, the receiver may use this information in order to determine the configuration information of the multiview 3D image and may control the output of the multiview 3D image.

Other subtitle/caption data may exist with respect to the 3D image of each view in the multiview 3D image, and such data is added to the subtitle/caption 3 (4340).

The multiview OSD/subtitle/caption depth information (4350) may assign disparity information respective to a subtitle/caption window in 3D image units for each view, and the 3D image of multiple views may share the same window disparity. Moreover, in order to output a 3D OSD, depth range information is provided in 3D image units for each view.

Figure 5:
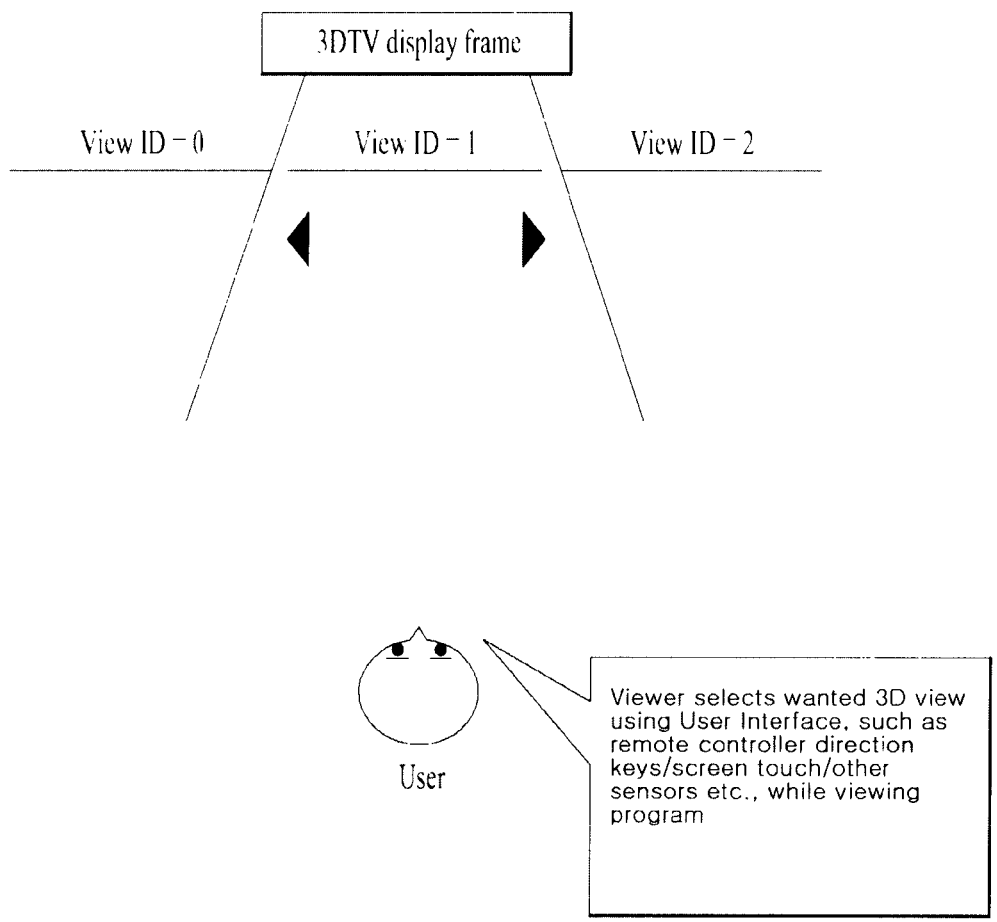
FIG. 5 illustrates a plane view showing a single 3DTV display case according to an exemplary embodiment of the present invention.

FIG. 5 illustrates a plane view showing a single 3DTV display case according to an exemplary embodiment of the present invention.

In case of a multiview 3D image having 3 display views, a single 3DTV display receiving device may select and view different 3D views (e.g., different viewing angle with respect to the same content) through a single 3D display frame. Since the receiving device can display only one view at each time, the user may select and view the 3D image of a wanted view by using a user interface (UI), such as a remote controller direction key, screen touch, or other sensor, while viewing the 3D image. In the drawing, the user is viewing view ID 1, and the user may be capable of viewing view ID 0 or view ID 3 by using the above-described method.

Figure 6:
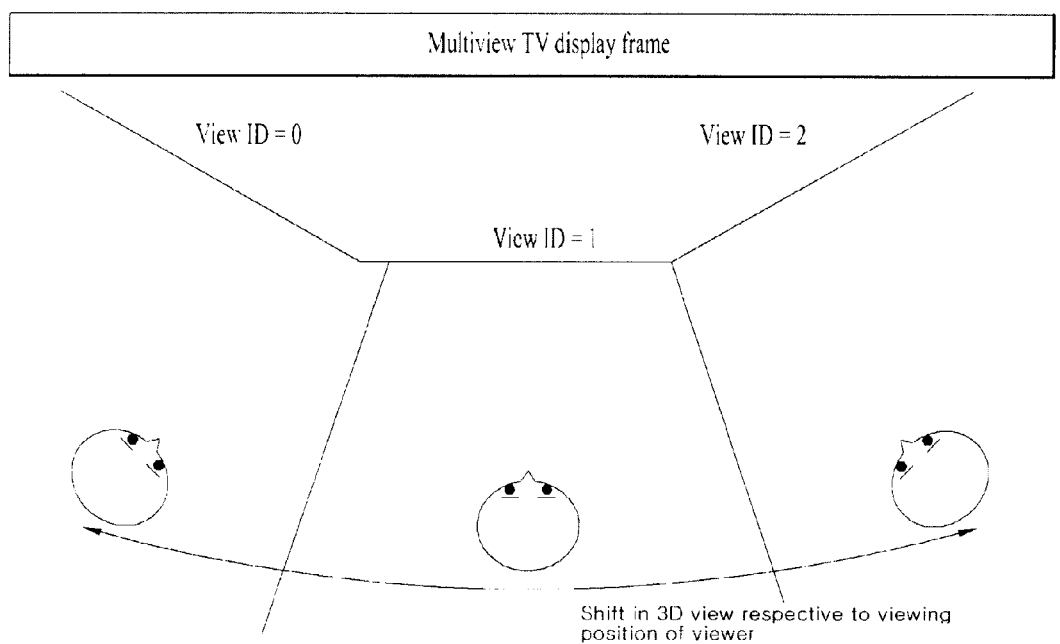
FIG. 6 illustrates a plane view showing a multiview 3DTV display case according to an exemplary embodiment of the present invention.

FIG. 6 illustrates a plane view showing a multiview 3DTV display case according to an exemplary embodiment of the present invention.

FIG. 6 corresponds to a drawing showing a case of one viewer viewing a 3D image of different views in accordance with the viewing angle or location, wherein the corresponding case is seen from above (or a bird's eye view). In case the user is positioned on a left side of the display, the image of view ID 0 may be viewed, in case the user is positioned in front of the display, the image of view ID 1 may be viewed, and in case the user is positioned on a right side of the display, the image of view ID 2 may be viewed.

Figure 7:
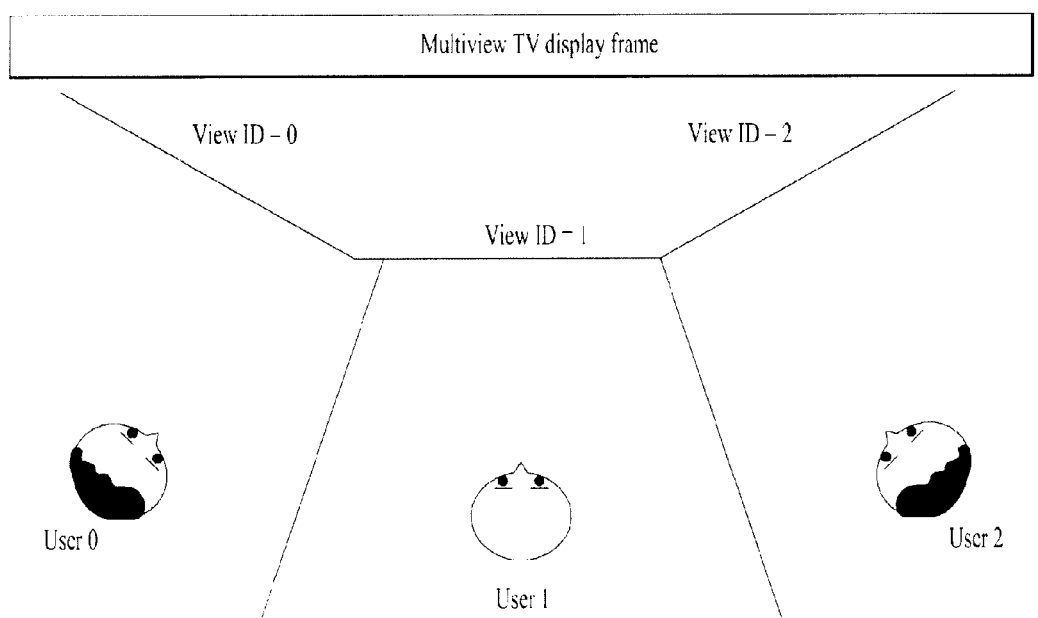
FIG. 7 illustrates a plane view of a multiview 3DTV display case, in a case when multiple viewers exist, according to an exemplary embodiment of the present invention.

FIG. 7 illustrates a plane view of a multiview 3DTV display case, in a case when multiple viewers exist, according to an exemplary embodiment of the present invention.

FIG. 7 corresponds to a drawing showing a case of three viewers each viewing a different 3D view in accordance with the viewing angle or location, wherein the corresponding case is seen from above (or a bird's eye view). In FIG. 7, user 0 positioned at the left side of the display views the image corresponding to view ID 0, and user 1 positioned at the center views the image corresponding to view ID 1. Additionally, user 2 positioned at the right side of the display views the image corresponding to view ID 2. The view ID respective to each position may be arbitrarily varied and, therefore, will not be limited only to the example presented herein.

FIG. 8 illustrates detailed information being included a Multiview_descriptor according to an exemplary embodiment of the present invention.

The Multiview_descriptor may include information on each 3D view or common characteristic of the overall multiview 3D image service being included in the multiview 3D image program within the PMT. This descriptor corresponds to a descriptor of a program or service level. Accordingly, this descriptor may be useful when simultaneously receiving multiple streams and displaying the received streams all at the same time, and, even if only one stream information is known, this descriptor may be capable of identifying to which 3D view the corresponding stream belongs. The Multiview_descriptor may be used in a Virtual Channel Table or a Service Map Table in order to signal the multiview 3D image at a program level.

The Multiview_descriptor may include a descriptor_tag field, a descriptor_length field, a num_3D_views field, a camera_arrangement_type field, a supported_angle_of_view_type field, a supported_angle_of_view field, a Camera_to_object_distance field, a 3D_view_ID field, a 3D_view_priority field, a left_PID field, a right_PID field, a left_cam_ID field, a right_cam_ID field, a left_cam_position field, a right_cam_position field, a min_disparity field, and/or a max_disparity field.

The descriptor_tag field is an 8-bit field, which identifies a descriptor type. According to the embodiment of the present invention, the multiview_descriptor has a value of 0xTBD.

The descriptor_length field corresponds to a 8-bit counter, which indicates the number of bytes following the descriptor_length field.

The num_3D_views field is an 8-bit field, which signifies a total number of 3D views provided by the multiview 3D image program.

The camera_arrangement_type field is a 2-bit field, which represents the arrangement type of multiple cameras in the corresponding multiview program. When the corresponding value is equal to '00', the type may correspond to a Circular convergent type, when the field value is equal to '01', the type may correspond to a Linear Convergent type, when the field value is equal to '10', the type may correspond to a Linear Parallel type, and when the field value is equal to '11', the type may correspond to any other type.

The supported_angle_of_view_type field is a 1-bit field, which indicates an expressed form of the supported_angle_of_view field. When the value of this field is equal to 0, the supported_angle_of_view is indicated in angle units, and when the value of this field is equal to 1, the supported_angle_of_view is indicated in distance units.

The supported_angle_of_view field is an 8-bit field, which indicates an overall viewing angle covered by the 3D stereoscopic image, which is provided by the corresponding multiview 3D image program, or distance information between cameras positioned at each left and right ends of the camera arrangement. In case of the latter, the overall viewing angle may be calculated by combining the value of this field with the value of the camera_to_object_distance. Herein, when the value of the above-described supported_angle_of_view_type is equal to '0', this may indicate the viewing angle, and when the value of the corresponding field is equal to '1', this may indicate a distance between the center points of the cameras located at each end of the camera arrangement.

The Camera_to_object_distance field is an 8-bit field, which signifies a distance between an image plane, in which an image is formed based upon a center of the multiview camera arrangement, and a recorded (or filmed) object. In case of the Linear convergent type camera arrangement or the Linear Parallel type camera arrangement, this field indicates the distance between the image plane, in which an image corresponding to a center camera of the multiple camera arrangement is formed, and the recorded object. In case of the Circular convergent type camera arrangement, all cameras are spaced apart from the object at the same distance.

The following fields correspond to information that can be provided for each view of the multiview image service through a for-loop.

The 3D_view_ID field corresponds to an 8-bit field being provided in a 3D view unit, which represents a unique identifier enabling each 3D view to be identified at each level.

The 3D_view_priority field corresponds to an 8-bit field being provided in 3D view units, which represents the priority level of each view. The 3D_view_priority field may provide information on which view is to be displayed at a higher priority, among the multiple views, when the number of views (num_3D_views) that are provided by the multiview 3D image service is greater than the number of views that can be displayed by the receiving device.

The left_PID field corresponds to a 13-bit field being provided in 3D view units, which represents a PID of a left view image included in the corresponding 3D view.

The right_PID field corresponds to a 13-bit field being provided in 3D view units, which represents a PID of a right view image included in the corresponding 3D view.

The left_cam_ID field corresponds to an 8-bit field being provided in 3D view units, which represents an identifier (ID) of a camera that has acquired elementary stream data corresponding to the left view image during the process of creating the corresponding 3D view. This value may be identical to the component_tag value respective to the video element stream corresponding to the left view image.

The right_cam_ID field corresponds to an 8-bit field being provided in 3D view units, which represents an identifier (ID) of a camera that has acquired elementary stream data corresponding to the right view image during the process of creating the corresponding 3D view. This value may be identical to the component_tag value respective to the video element stream corresponding to the right view image.

The left_cam_position field corresponds to an 8-bit field being provided in 3D view units, which represents the position (or location) of a camera that has acquired data corresponding to the left view image and also represents a distance or angle with respect to a center point of the camera arrangement.

The right_cam_position field corresponds to an 8-bit field being provided in 3D view units, which represents the position (or location) of a camera that has acquired data corresponding to the left view image and also represents a distance or angle with respect to a center point of the camera arrangement. At this point, negative numbers (−) signify that the camera is placed towards the left side of the center point, and positive numbers (+) signify that the camera is placed towards the right side of the center point. In case the camera arrangement corresponds to a Linear convergent type and a Linear Parallel type in accordance with each camera_arrangement_type, the relative position from the center of the corresponding camera arrangement may be expressed by a distance value. In case the camera arrangement corresponds to a Circular convergent type, a relative position of the corresponding camera arrangement may be expressed by a distance value from the center of the camera arrangement. As described above, when the number of cameras used for the camera arrangement corresponds to an odd number, the right_cam_position field may be expressed based upon the camera located at the very center of the camera arrangement.

The min_disparity field corresponds to an 8-bit field being provided in 3D view units, which represents a depth budget (depth range) of each 3D view. More specifically, this field represents a minimum disparity value, which is provided by the corresponding 3D view.

The max_disparity field corresponds to an 8-bit field being provided in 3D view units, which represents a depth budget (depth range) of each 3D view. More specifically, this field represents a maximum disparity value, which is provided by the corresponding 3D view.

FIG. 9 illustrates a Multiview_service_descriptor according to an exemplary embodiment of the present invention.

The Multiview_service_descriptor may signal a common characteristic of the overall service of the multiview 3D image program in a program level of the PMT.

The Multiview_service_descriptor may include a descriptor_tag field, a descriptor_length field, a num_3D_views field, a camera_arrangement_type field, a supported_angle_of_view_type field, a supported_angle_of_view field, and/or a camera_to_object_distance field.

The detailed description of each field may be replaced by the description of the Multiview_descriptor provided above.

FIG. 10 illustrates a Multiview_element_descriptor according to an exemplary embodiment of the present invention.

The Multiview_element_descriptor includes information on metadata of each element stream and/or information on a 3D image of a related view, each being included in the multiview 3D image program in a PMT element level.

The Multiview_element_descriptor may include a descriptor_tag field, a descriptor_length field, a camera_ID field, a camera_position field, a number_3D_views field, a 3D_view_ID field, a 3D_view_priority field, a left_right_view field, an other_camera_ID field, a min_disparity field, and/or a max_disparity field.

The camera_ID is an 8-bit field, which corresponds to an identifier (ID) identifying a camera that is used for acquiring data of the corresponding element stream. The camera_ID may be used as a field for performing mapping with a left_cam_ID and a right_cam_ID of the Program/service level. The camera_ID may be assigned with the same value as the component_tag value.

The camera_position is an 8-bit field, which represents a position value of the camera that is used for acquiring data of the corresponding element stream. Based upon the camera located at the very center of the camera arrangement, a negative number (−) indicates the left, and a positive number (+) indicates the right. In case the camera is arranged along a circumference, the camera_position is indicated by a relative angle value based upon the camera, which is located at the very center of the arrangement, and in case the camera is arranged along a horizontal line, the camera_position is indicated by a relative position value based upon the camera, which is located at the center of the arrangement. When the number of cameras is equal to an even number, the reference point becomes the center point of the arranged cameras.

The number_3D_views is a 3-bit field, which indicates a number of 3D views included in the corresponding element stream. This field may be given a different value for each element stream. For example, when the camera_id is equal to 1 in the example shown in FIG. 4(b), the camera is included in 2 3D views of View ID 0 and View ID 1. At this point, the value of the number_3D_views is equal to 2.

The 3D_view_ID corresponds to an 8-bit field, which indicates an identifier of a 3D view to which the corresponding element stream belongs. Thus, it may be known in which 3D view the corresponding element stream is included.

The 3D_view_priority corresponds to an 8-bit field, which may indicate the priority level of the 3D view to which the corresponding element stream belongs. As described in FIG. 6, when the number of views that can be displayed by the receiving device is limited, this value may be used to decide which view is to be displayed at a higher priority level.

The left_right_view field corresponds to a 1-bit field, which indicates whether the corresponding element stream is included in the left view image or the right view image within the current 3D view, to which the corresponding element stream belongs. When the value of this field is equal to '0', this indicates that the element stream is included in the left view image, and when the value of this field is equal to '1', this indicates that the element stream is included in the right view image.

The other_camera_ID field corresponds to an 8-bit field, which indicates an identifier of a camera that is used for acquiring data of an element stream forming a pair with the current element stream in order to generate the respective view. Since this value performs the role of identifying another element stream, this value may be replaced with a value corresponding to the PID or camera position.

Each of min_disparity and max_disparity corresponds to an 8-bit field, which represents a depth budget (depth range) of each 3D view. More specifically, these fields may signify minimum and maximum disparity of a stereoscopic image being provided by each 3D view. When a graphic element, such as an OSD is outputted to each view of the 3D image by using these values, reference may be made to this value in order to decide the 3D coordinates. For example, by parsing min_disparity value of a specific view, the broadcast receiver may determine settings so that a disparity value smaller than this value can be applied to the OSD display, and by parsing max_disparity value of a specific view, the broadcast receiver may determine settings so that a disparity value greater than this value can be applied to the OSD display. According to another exemplary embodiment of the present invention, when the same display depth of the OSD is sought to be maintained in the 3D image respective to each view, the min_disparity value of the 3D image respective to each view is parsed, and, among such values, the disparity value being smaller than the smallest min_disparity value may be applied to the OSD display. Additionally, the max_disparity value of the 3D image respective to each view is parsed, and, among such values, the disparity value being greater than the greatest max_disparity value may be applied to the OSD display.

FIG. 11 illustrates a Multiview_subtitle_descriptor according to an exemplary embodiment of the present invention.

The Multiview_subtitle_descriptor according to the exemplary embodiment of present invention may be included in a PMT, VCT, and/or SDT and may be used for signaling information related to the subtitle respective to the 3D image of each view in the program level or service level.

The Multiview_subtitle_descriptor may include a descriptor_tag field, a descriptor_length field, a num_3D_views field, a 3D_view_ID field, a 3D_view_priority field, a multiview_subtitle_type field, a new_subtitle_stream_PID field, and/or a new_subtitle_segment type field.

The multiview_subtitle_type notifies a characteristic of a subtitle stream that is to be applied to the 3D image of a specific view. For example, depending upon the value of this field, the corresponding field may be defined to have the following significance. However, the present invention will not be limited only to this.

When the multiview_subtitle_type is set to '000', a legacy subtitle is re-used, or the same data as a subtitle stream, which is applied to a 2D image, is used. For example, subtitle data related to the same page, region may be used. Moreover, disparity information, which is applied to a 3D image corresponding to a view having the highest priority level (e.g., 3D image of a view having the 3D_view_priority value of 0), may be directly used.

When the multiview_subtitle_type is set to '001', this may indicate that additional subtitles can be used. For example, a subtitle bitmap data essentially used in the 2D image and a disparity (or depth) having the subtitle of a 3D image respective to the view corresponding 3D_view_priority=0 (stereo) applied thereto, may be directly used. However, data of a section related to a subtitle being included in the PES packet having a new_subtitle_stream_PID value and/or a new_subtitle_segment_type may be additionally applied. For example, this indicates that subtitle data respective to a new region/added region and subtitle data respective to an added object may be used.

When the multiview_subtitle_type is set to '010', this may indicate that disparity data shall be replaced with subtitle data being provided for the 3D image respective to each view. For example, this may indicate that a subtitle bitmap data used in the 2D image may be directly used. However, this also indicates that depth other than that of the 3D image respective to another view is applied herein. At this point, depth data being included in the PES packet having a new_subtitle_stream_PID value and/or a new_subtitle_segment_type may be applied.

When the multiview_subtitle_type is set to '011', this may indicate that all data related to the subtitle should be replaced. For example, all data starting from the conventional subtitle bit map and up to the disparity data may be replaced with new data.

The new_subtitle_stream_PID designates a PID (Packet Identifier) value of a subtitle stream, which is applied to the 3D image respective to a specific view. Information such as, page, region, object, and so on, configuring the subtitle may be transmitted in the form of PES segment, and a unique PID value respective to the corresponding information may be designated. Therefore, by using this field, a specific subtitle stream to which the 3D image of the corresponding view is to be applied may be signaled.

The new_subtitle_segment type corresponds to an identifier that can identify a subtitle segment, which is applied to the 3D image respective to a specific view. When a subtitle is added or replaced in the 3D image of the specific view, the segment_type may be replaced with a subtitle segment having the same value as this field.

The description of other fields that may be included in the Multiview_subtitle_descriptor may be replaced with the description of the above-described fields having the same field name.

A procedure for decoding a multiview 3D broadcast image and a subtitle related to each view of the multiview 3D broadcast receiver may be performed as described below.

The receiver performs decoding on a 2D subtitle. The receiver parses a multiview_subtitle_type field respective to the 3D image of each view.

When the multiview_subtitle_type is equal to '000', the receiver may apply a subtitle stream having a PID value of 0x1A00 to the corresponding 3D image.

When the multiview_subtitle_type is equal to '001', along with the subtitle stream having a PID value of 0x1A00, in the stream having a PID value indicated in the new_subtitle_stream_PID, subtitle data corresponding to the new_subtitle_segment_type value are added.

When the multiview_subtitle_type is equal to '010', among the subtitle sections having the PID value of 0x1A00, only the section that has indicated the disparity value is replaced with the data indicated in the new_subtitle_segment_type of the new_subtitle_stream_PID.

When the multiview_subtitle_type is equal to '011', the conventional subtitle stream is disregarded and a stream having a PID value indicated in the new_subtitle_stream_PID and the new_subtitle_segment_type is applied as the subtitle data.

The receiver formats subtitle data, which are processed as described above, along with the 3D image and outputs the formatted data. During this process, the above-described information related to the subtitle may be used.

FIG. 12 illustrates a Multiview_caption_descriptor according to an exemplary embodiment of the present invention.

The Multiview_caption_descriptor according to the exemplary embodiment of present invention may be included in a PMT, VCT, and/or SDT and may perform the function of signaling information related to the subtitle respective to the 3D image of each view in the program level or service level.

The Multiview_caption_descriptor may include a descriptor_tag field, a descriptor_length field, a num_3D_views field, a 3D_view_ID field, a 3D_view_priority field, and/or a caption_service_number field.

The caption_service_number notifies a service_number value of a 3D Caption, which is applied to a 3D image respective to a specific view. The receiver applies caption data corresponding to a service_number, which matches with this field, to a 3D image of the corresponding view.

In the Multiview_caption_descriptor, when a caption_service_number is not indicated with respect to a specific 3D_view_ID, the receiver may use the caption_service_number, which is applied to a 3D view having a 3D_view_priority value of 0, on the 3D image of the corresponding view by default.

The description of other fields that may be included in the Multiview_caption_descriptor may be replaced with the description of the above-described fields having the same field name.

Figure 13:
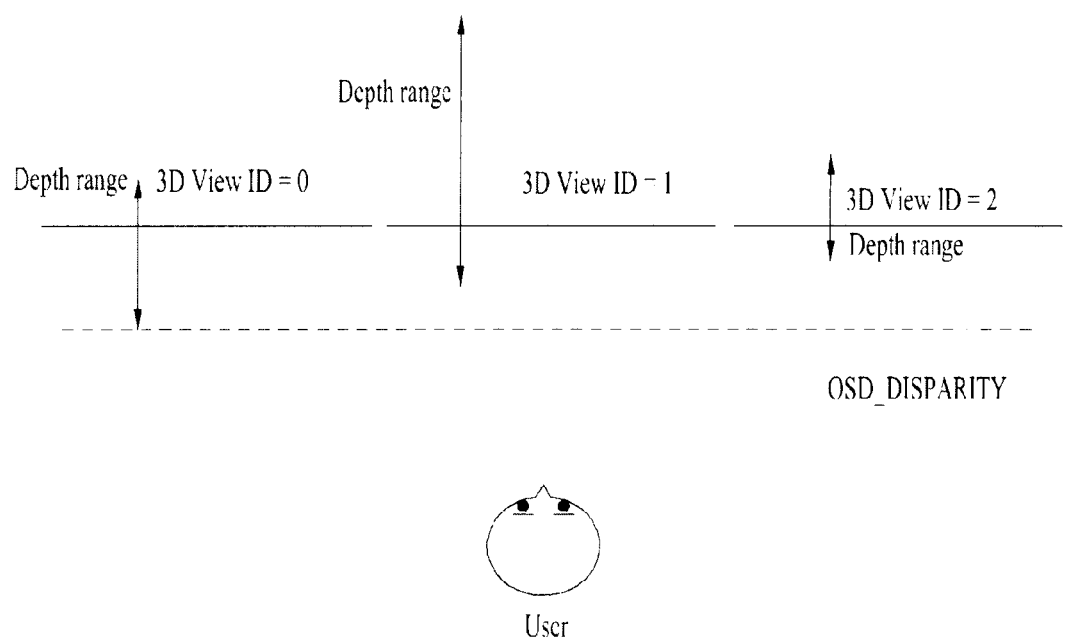
FIG. 13 illustrates an OSD display control in a single user mode according to an exemplary embodiment of the present invention.

FIG. 13 illustrates an OSD display control in a single user mode according to an exemplary embodiment of the present invention.*

An OSD display control shown in FIG. 13 may be applied to a case of providing a 3D image of a different view in accordance with the user's position (or location).

The OSD display control shown in FIG. 13 shows a case when the display of the OSD maintains a predetermined depth regardless of the location of the user.

The receiver parses a min_disparity value respective to the 3D image of each view. Among the min_disparity values, the receiver selects a min_disparity having the smallest disparity value and uses the selected value as the disparity value for the OSD display. According to another exemplary embodiment of the present invention, a disparity value for the OSD display that is smaller than the minimum disparity value, among the above-described disparity values, may be created as used. The disparity value for displaying the OSD, which is decided as described above, may be collectively applied to the 3D image of each view, so that the OSD depth can be set to remain unchanged even when the user changes his (or her) position (or location).

For example, as shown in the drawing, the depth range of each of the 3D image of a first view (3D View ID=0), the 3D image of a second view (3D View ID=1), and the 3D image of a third view (3D View ID=2) is different from one another, since the min_disparity value indicated by the depth range of the 3D image of a first view (3D View ID=0) is the smallest (a 3D image of a view including a 3D effect being displayed to seem most approximate to the user), the disparity value of the OSD is decided based upon the min_disparity value of the 3D image of a first view (3D View ID=0), and the OSD may be displayed by using this value.

Figure 14:
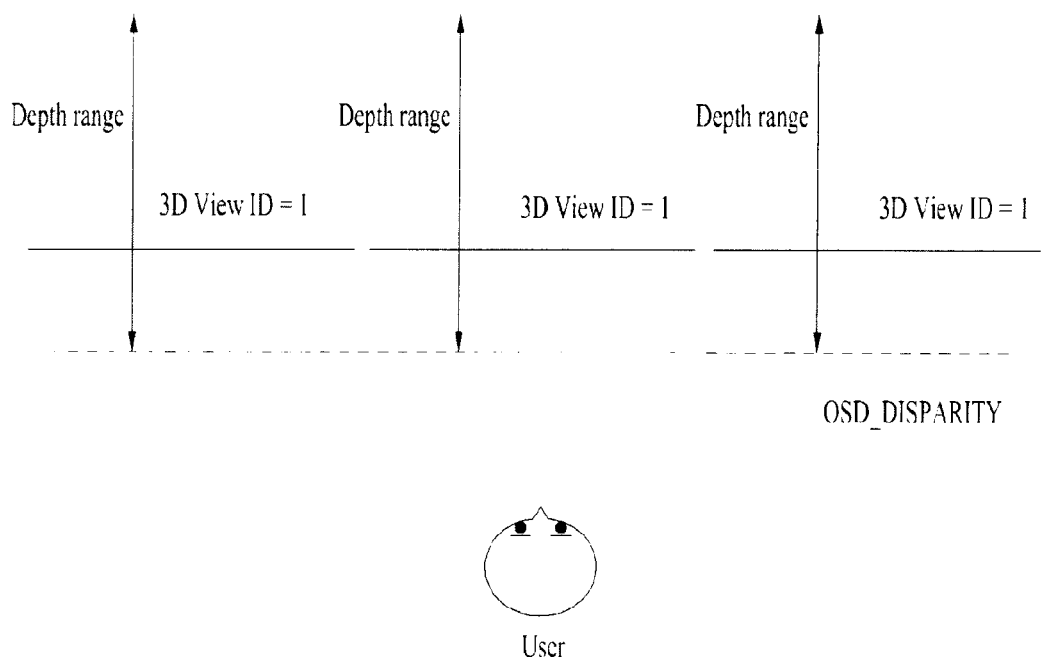
FIG. 14 illustrates an OSD display control in a single user mode according to another exemplary embodiment of the present invention.

FIG. 14 illustrates an OSD display control in a single user mode according to another exemplary embodiment of the present invention.

The control of the OSD display shown in FIG. 14 may be applied to a case of providing a 3D image respective to the same view regardless of the user's position (or location).

This case may occur when the display of the multiview 3D image is selected to correspond to a fixed view mode, based upon the user settings. More specifically, this corresponds to a case when the 3D image of the same view is displayed regardless of the position (or location) of the user. In this case, with reference to the min_disparity value of the corresponding view, a disparity value that is smaller than the reference value may be set up for the display of the OSD.

For example, as shown in the drawing, the 3D image of the second view (3D View ID=1) is displayed regardless of the position of the viewer. Accordingly, by applying the min_disparity value of the 3D image of the second view, the OSD may be outputted along with the 3D image of the second view.

Figure 15:
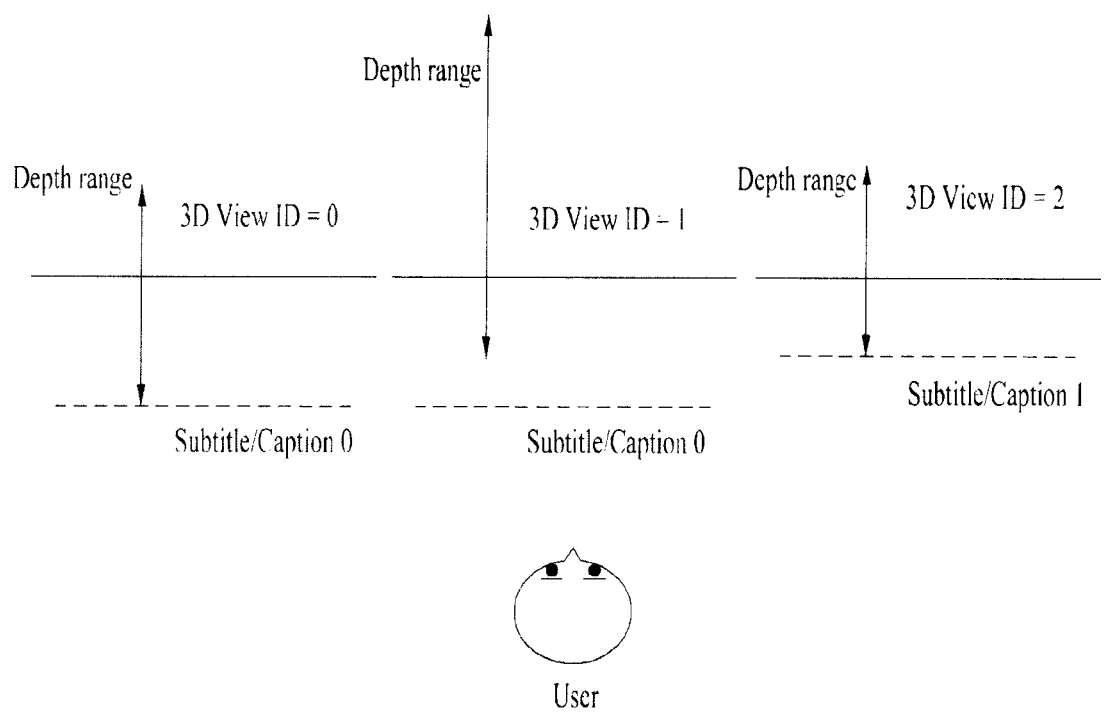
FIG. 15 illustrates a subtitle/caption display control in a single user mode according to an exemplary embodiment of the present invention.

FIG. 15 illustrates a subtitle/caption display control in a single user mode according to an exemplary embodiment of the present invention.

The subtitle/caption display control shown in FIG. 15 may be applied to a case of providing the 3D image of another view in accordance with the user's position (or location).

In a Single user mode, it is preferable that the display depth of the subtitle/caption is consistent regardless of the user's position. However, with respect to the 3D image of the specific view, a situation, when a subtitle/caption having a depth that is different from that of the 3D image of another view should be displayed, may inevitably occur. In this case, the Multiview subtitle descriptor and/or Multiview caption descriptor may also signal that the subtitle/caption respective to the specific view should have a depth different from that of the 3D image of another view.

The receiver outputs a 3D image of a specific view, which is set to be shown (or displayed) in accordance with the user's position, and a subtitle/caption depth, which is differently defined for the 3D image of each view, may be applied. The subtitle/caption applies a depth that is intended by the producer with respect to the corresponding point. At this point, information of the Multiview Subtitle Descriptor or Multiview Caption Descriptor, which is provided with respect to the 3D image of each view, may be applied so as to display the subtitle/caption.

For example, as shown in the drawing, although each of the 3D image of the first view (3D View ID=0) and the 3D image of the second view (3D View ID=1) has a different depth range, it may be intended by the producer to apply the same subtitle/caption. Therefore, the subtitle/caption disparity (depth) value respective to the two views may be identically applied. Conversely, however, since the 3D image of the third view corresponds to a case when the subtitle/caption is intended to be displayed at a different depth, a subtitle/caption disparity (depth) value for the 3D image of the corresponding view may be applied.

Figure 16:
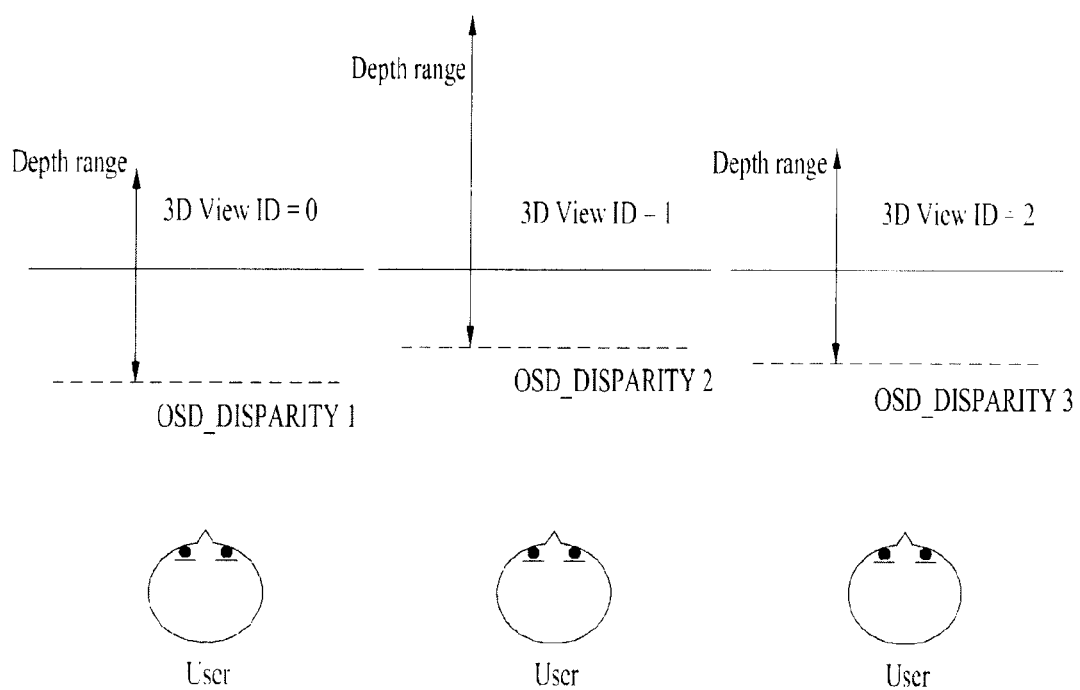
FIG. 16 illustrates an OSD display control in a multiple user mode according to an exemplary embodiment of the present invention.

FIG. 16 illustrates an OSD display control in a multiple user mode according to an exemplary embodiment of the present invention.

In the OSD display control shown in FIG. 16, since each viewer is viewing a 3D image of a different view, by applying the OSD display depth respective to each view, each viewer may be provided with an OSD that is being outputted from different depths.

In case of the multiple user mode, since independent OSD control is required for each viewer, the OSD depth may vary in accordance with the characteristics of each 3D image that is viewed by each viewer.

The receiver parses the min_disparity value respective to the 3D image of each view, so as to be capable of applying a disparity value, which is smaller than the parsed min_disparity value, to the OSD display of the 3D image of each view.

Figure 17:
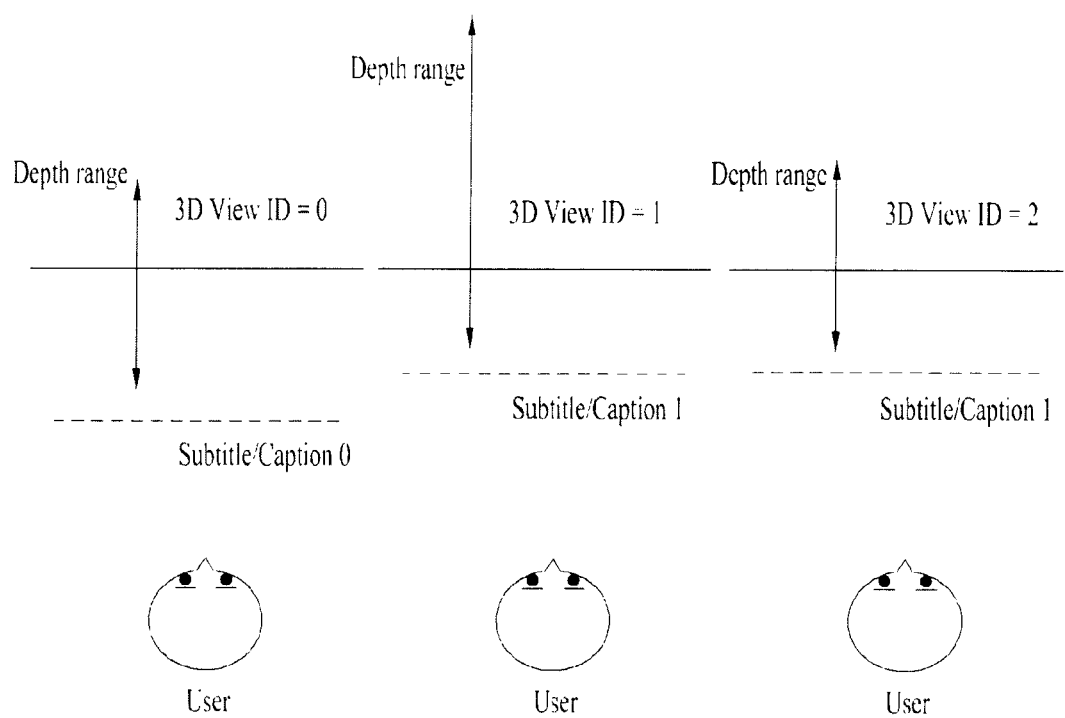
FIG. 17 illustrates a subtitle/caption display control in a multiple user mode according to an exemplary embodiment of the present invention.

FIG. 17 illustrates a subtitle/caption display control in a multiple user mode according to an exemplary embodiment of the present invention.

Since each viewer is viewing a 3D image of a different view, the subtitle/caption display control shown in FIG. 17 may apply a subtitle/caption display depth respective to each view, so as to allow each viewer to be provided with a subtitle/caption that is being outputted from a different depth.

In case of the multiple user mode, since independent subtitle/caption control is required for each viewer, the subtitle/caption depth may vary in accordance with the characteristics of each 3D image that is viewed by each viewer.

The receiver applies information related to the subtitle/caption, which is included in the multiview subtitle descriptor or multiview caption descriptor respective to the 3D image of each view.

For example, as shown in the drawing, this corresponds to a case when the disparity value of the subtitle/caption belonging to the 3D image of the first view (3D View ID=0) is set to be different from the disparity value of the subtitle/caption belonging to the 3D image of the second view (3D View ID=1), thereby being delivered to the corresponding descriptor. Although the depth range of the 3D image of the third view is different from the depth range of the 3D image of the second view, since the disparity value of the subtitle/caption is equally applied and signaled accordingly, the subtitle/caption is displayed and provided to the user from the same depth.

Figure 18:
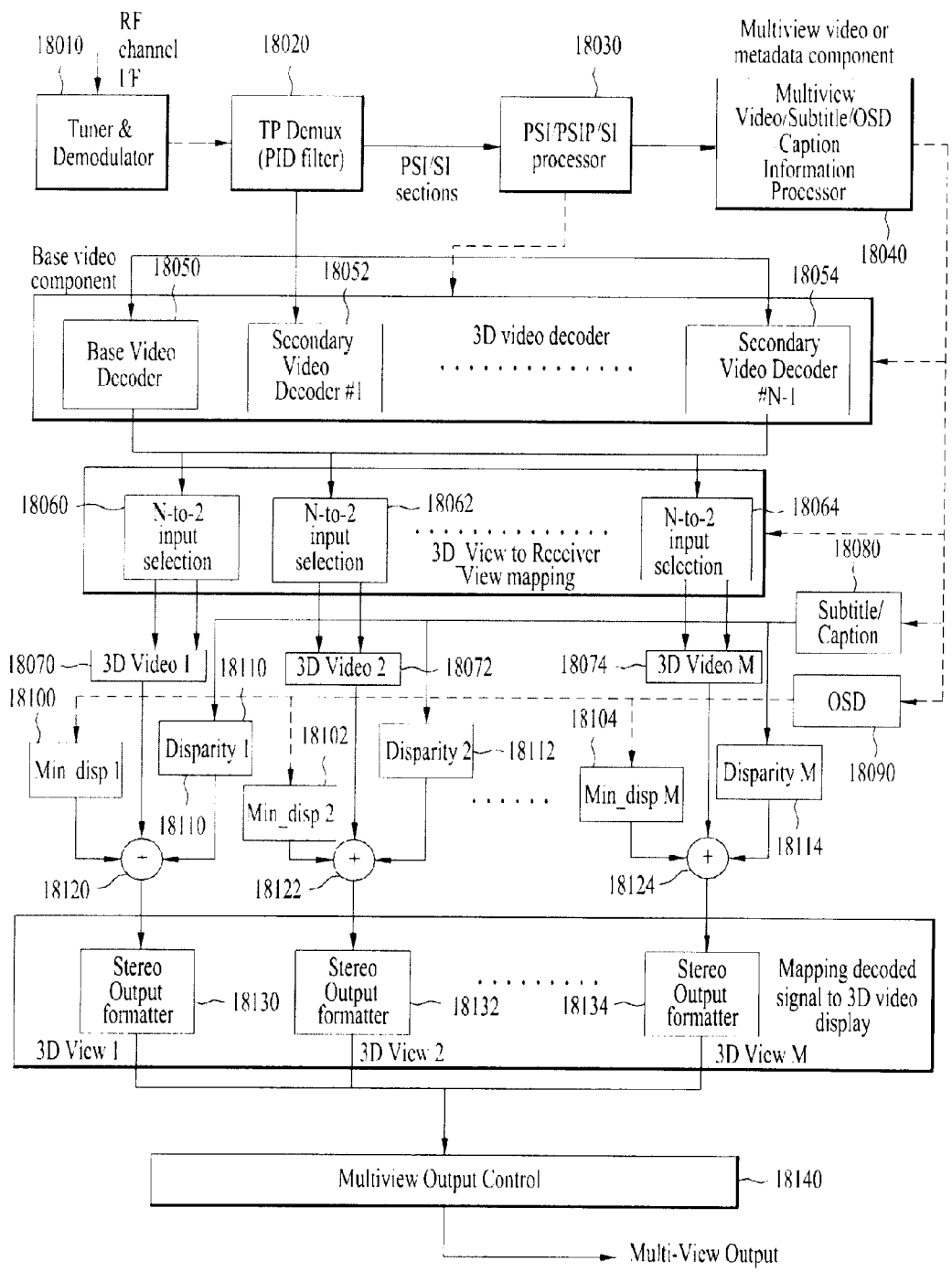
FIG. 18 illustrates a multiview 3D image receiver according to an exemplary embodiment of the present invention.

FIG. 18 illustrates a multiview 3D image receiver according to an exemplary embodiment of the present invention.

The broadcast signal receiving device according to the exemplary embodiment of the present invention may include a tuner and demodulator (18010), a demultiplexer (18020), a signaling data processor (18030), a multiview information processor (18040), a plurality of video decoders (18050, 18052, 18054), a plurality of selectors (18060, 18062, 18064), 3D video rendering units for multiple views (18070, 18072, 18074), a subtitle/caption processing unit (18080), an OSD processing unit (18090), a plurality of minimum disparity extracting units (18100, 18102, 18104), a plurality of OSD disparity calculating unit (18110, 18112, 18114), a plurality of data combining units (18120, 18122, 18124), a plurality of formatters (18130, 18132, 18134), and/or a multiview output control unit (18140).

The tuner and demodulator (18010) may tune a received broadcast signal and, after performing demodulating on the tuned broadcast signal, the tuner and demodulator (18010) may output the demodulated broadcast signal to the demultiplexer (18020). In this case, the tuner (18010) may perform Vestigial Side Band (VSB) demodulation or Orthogonal Frequency Division Multiplexing (OFDM) demodulation.

The demultiplexer (18020) may extract a video stream PID from signaling data, and may extract a video stream or metadata component from the decoded broadcast signal by using the corresponding video stream PID, based upon a PID respective to a 3D view, which is selected through a user interface (UI), thereby outputting the extracted information to the plurality of video decoders (18050, 18052, 18054). At this point, a base video component may be inputted to a base video decoder (18050), and a multiview video component or metadata component may be inputted to a second video decoder (18052, 18054).

The signaling data processor (18030) may parse signaling data from a signal, which is outputted from the demultiplexer (18020) and may then output the parsed signaling data. In this case, the signaling data may include PSI, PSIP, DVB-SI, and so on. A portion of the signaling data may be inputted to the video decoders (18050, 18052, 18054) and used, and another portion of the signaling data may be inputted to the multiview information processor (18040) and used. At this point, the signaling data may include information on a 3D view, which is selected through a user interface (32090).

Among the signaling data inputted from the signaling data processor (18030), the multiview information processor (18040) parses information on a multiview 3D image service respective to the view that is selected through the user interface (32090). Such parsed information is inputted to the video decoders (18050, 18052, 18054) or selectors (18060, 18062, 18064), thereby being used as information for generating a multiview 3D image service. The multiview information processor (18040) may perform the function of parsing the above-described descriptor or signaling information with respect to the subtitle, caption, and/or OSD, which are related to the multiview 3D image.

The plurality of video decoders (18050, 18052, 18054) decode components inputted from the demultiplexer (18020). At this point, the base video decoder may decode the base video component, and the second video decoders (18052, 18054) may decode the multiview video component or metadata component. When performing decoding, the plurality of video decoders (18050, 18052, 18054) may use the information inputted from the signaling processor (18030) or multiview information processor (18040).

Among the plurality of image signals outputted from the plurality of video decoders (18050, 18052, 18054), the plurality of selectors (18060, 18062, 18064) may select two video signals corresponding to a left view image and a right view image respective to each view. More specifically, this corresponds to an operation of mapping the 3D view of the reception signal to the view of the receiving device. At this point, the selection of the two video signals corresponding to a left view image and a right view image respective to each view may be selected based upon a 3D view, which is selected by the user interface (32090). Additionally, information of a multiview 3D image service being outputted from the multiview information processor (18040) may be used.

The 3D video rendering units for multiple views (18070, 18072, 18074) each performs the function of rendering multiple sets of video data respective to multiple views.

The subtitle/caption processing unit (18080) processes information related to the subtitle/caption. For example, the subtitle/caption processing unit (18080) extracts disparity of the subtitle/caption respective to each view and delivers the extracted information to a following processing block, so that the extracted information can be combined with the 3D image of the corresponding view.

The OSD processing unit (18090) processes information related to the OSD. For example, the OSD processing unit (18090) extracts a max_disparity value and/or a min_disparity value respective to each view, thereby delivers the extracted values to the following processing block.

The plurality of minimum disparity extracting units (18100, 18102, 18104) extract a min_disparity value of each view.

The plurality of subtitle/caption disparity extracting units (18110, 18112, 18114) extracts a disparity value of the subtitle/caption respective to each view.

The plurality of data combining units (18120, 18122, 18124) each performs the function of combining a min_disparity value, which is extracted for the display of 3D video respective to each view and OSD, with a disparity value of the subtitle/caption, which is extracted for the subtitle/caption display.

The plurality of formatter (18130, 18132, 18134) use the min_disparity value, which is extracted for the display of 3D video respective to each view and OSD, and use the disparity value of the subtitle/caption, which is extracted for the subtitle/caption display, so as to perform the function of formatting the 3D image respective to each view.

The multiview output control unit (18140) controls the formatted 3D image respective to each view, so as to perform a function of displaying the formatted 3D image as a multiview image.

Figure 19:
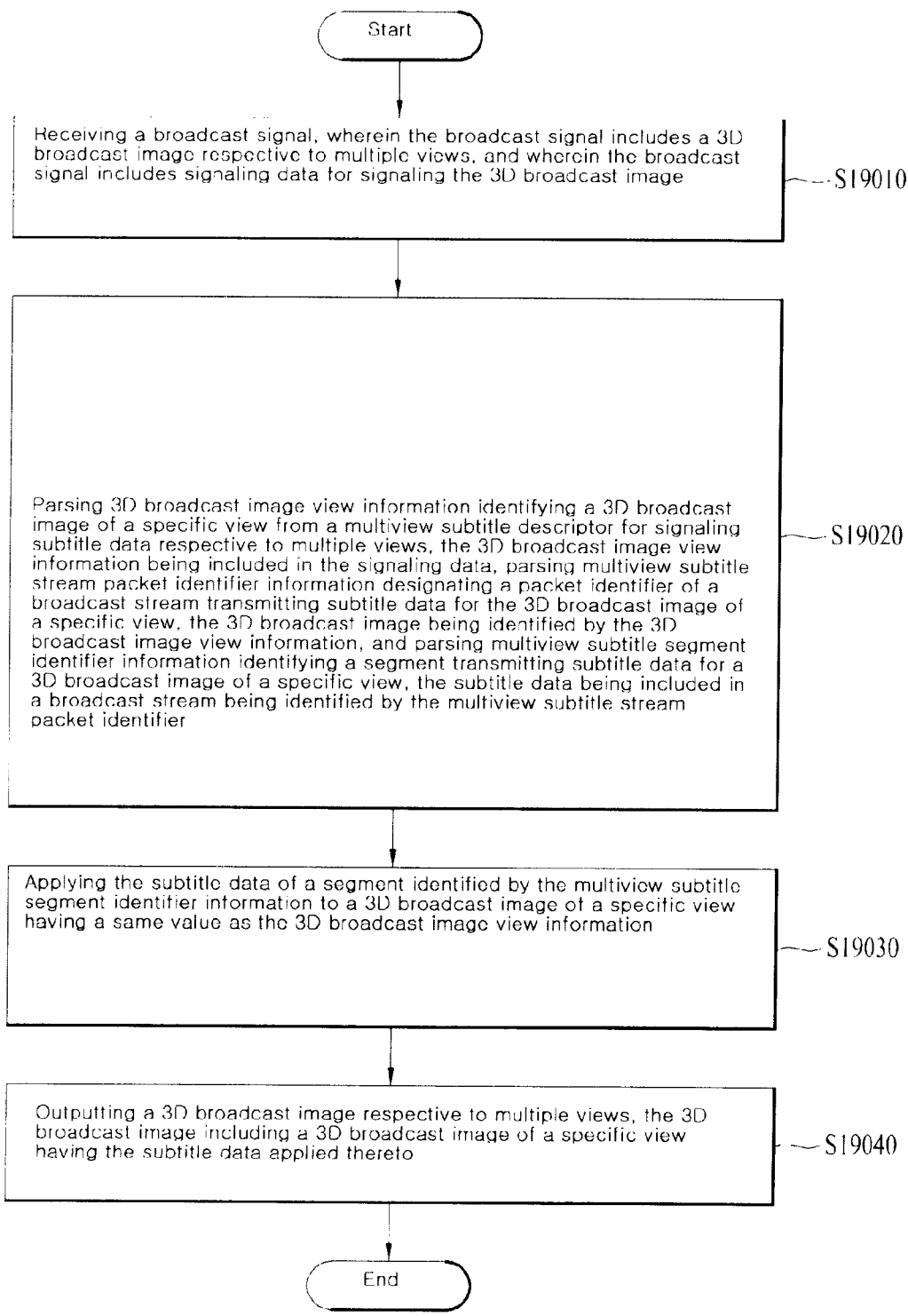
FIG. 19 illustrates a flow chart showing a method for receiving a 3D broadcast image with respect to a plurality of views according to an exemplary embodiment of the present invention.

FIG. 19 illustrates a flow chart showing a method for receiving a 3D broadcast image with respect to a plurality of views according to an exemplary embodiment of the present invention.

The 3D broadcast receiver according to the exemplary embodiment of the present invention receives a broadcast signal, which includes a 3D broadcast image respective to multiple views and signaling data for signaling the 3D broadcast image (s19010).

The 3D broadcast receiver parses 3D broadcast image view information identifying a 3D broadcast image of a specific view from a multiview subtitle descriptor for signaling subtitle data respective to multiple views, wherein the 3D broadcast image view information is included in the signaling data, parses multiview subtitle stream packet identifier information designating a packet identifier of a broadcast stream transmitting subtitle data for the 3D broadcast image of a specific view, wherein the 3D broadcast image is identified by the 3D broadcast image view information, and parses multiview subtitle segment identifier information identifying a segment transmitting subtitle data for a 3D broadcast image of a specific view, wherein the subtitle data is included in a broadcast stream being identified by the multiview subtitle stream packet identifier (s19020).

The 3D broadcast receiver applies the subtitle data of a segment identified by the multiview subtitle segment identifier information to a 3D broadcast image of a specific view having a same value as the 3D broadcast image view information (s19030).

The 3D broadcast receiver outputs a 3D broadcast image respective to multiple views, wherein the 3D broadcast image includes a 3D broadcast image of a specific view having the subtitle data applied thereto (s19040).

According to the present invention, regardless of the viewing position or viewing environment of the viewer, a 3D image best-fitting the intentions of the 3D content producer (or designer) may be provided.

Additionally, according to the present invention, the OSD, subtitle, and/or caption that are being displayed along with the 3D image do not cause distortion in the 3D image.

Moreover, according to the present invention, by using PSI, PSIP, and/or DVB SI system, signaling on the video data being additionally transmitted for the 3D broadcast service and information on the corresponding data may be transmitted.

Furthermore, by signaling resolution information, codec information, information on a recommended filtering technique when performing resizing, and so on, respective to additional data (secondary video), a method that can allow the receiver to provide a 3D service of higher quality is provided herein.

The method invention according to the present invention may be implemented in program command formats that can all be executed by a variety of computer means, thereby being recorded (or written) in a computer-readable medium. The computer-readable medium may include a program command, a data file, a data structure, and so on, either individually or in combination. The program command being written in the medium may either be specifically designed and configured for the present invention or may be disclosed to anyone skilled in the field of computer software, so as to be used. Examples of the computer-readable medium may include magnetic media such as a hard disk, a floppy disk, and a magnetic tape, optical media such as a CD-ROM and DVD, magneto-optical media such as a floptical disk, and hardware specifically designed for storing and executing program commands such as ROM, RAM, and flash memories. Examples of the program command may include machine language code that is created by a compiler, as well as a high-level language code that can be executed by using an interpreter. The above-described hardware device may be configured to be operated as at least one or more software modules for performing the operations of the present invention, and such configuration may also be inverted.

As described above, although the present invention has been described with reference to limited embodiments and drawings, it will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

MODE FOR CARRYING OUT THE PRESENT INVENTION

The best mode for carrying out the present invention has been described in detail.

INDUSTRIAL APPLICABILITY

As described above, the present invention may be applied to a system receiving and processing a multiview 3D broadcast image services.

What is claimed is:

1. A 3-dimensional (3D) broadcast receiver, comprising:
a tuner receiving a broadcast signal,
wherein the broadcast signal includes a plurality of video streams including a plurality of video data acquired by a plurality of cameras photographing a single subject from different positions, a subtitle stream including subtitle data and a program map table (PMT) for signaling the plurality of video streams and the subtitle data,
wherein a plurality of 3D views for viewers in different locations are provided by rendering two video data among the plurality of video data according to a multiview descriptor in the PMT, and
wherein a 3D view of the plurality of 3D views consists of one of the two video data as a left image and the other one of the two video data as a right image;
a signaling data processor parsing the multiview descriptor describing information on the plurality of video streams from a stream level of the PMT,
wherein the multiview descriptor includes 3D views number information indicating the number of 3D views consisting of video data in a video stream of the plurality of video streams, first 3D view identification information identifying a 3D view consisting of the video data in the video stream, left-right information identifying whether the video data in the video stream is rendered as a left image or a right image in the identified 3D view, camera identification information identifying a camera used for acquiring other video data constituting the identified 3D view with the video data in the video stream and disparity information indicating a disparity range of 3D images of the identified 3D view,
wherein the signaling data processor further parses a multiview service descriptor describing common information on a 3D service providing the plurality of the 3D views from a program level of the PMT, wherein the multiview service descriptor includes information indicating the number of 3D views provided in the 3D service, information indicating an arrangement type of cameras providing the 3D service, information indicating a viewing angle which the cameras support to provide the 3D service, and information indicating a distance from an intermediate point between the cameras to the single subject, wherein the arrangement type of cameras corresponds to a circular convergent type, a linear convergent type, or a linear parallel type, wherein the signaling data processor further parses a multiview subtitle descriptor describing subtitle information on a program provided by the plurality of video streams, and wherein the multiview subtitle descriptor includes number 3D views information indicating the number of 3D views provided in the program, a second 3D view identification information identifying a 3D view provided in the program, subtitle type information indicating a type of the subtitle data in the subtitle stream applied to the identified 3D view by the second 3D view identification information, subtitle stream identification information identifying the subtitle stream applied to the identified 3D view by the second 3D view identification information and subtitle segment identification information identifying a subtitle segment transmitting the subtitle data applied to the identified 3D view by the second 3D view identification information;

a 3D broadcast information processor applying the subtitle data transmitted in the identified subtitle segment to the 3D images of the identified 3D view by the first 3D view identification information, wherein the identified subtitle segment is transmitted in the identified subtitle stream, and wherein the first 3D view identification information and the second 3D view identification information have the same value; and a 3D image formatting processor outputting the 3D images of the identified 3D view by the first 3D view identification information with the subtitle data applied to the 3D images.

2. The 3D broadcast receiver of claim 1, wherein when the subtitle type information indicates that the subtitle data is additional subtitle data in addition to subtitle data for a 2-dimensional (2D) broadcast image, and wherein the subtitle stream identification information identifies a subtitle stream transmitting the additional subtitle data and the subtitle segment identification information identifies a segment transmitting the additional subtitle data.

3. The 3D broadcast receiver of claim 1, wherein the multiview subtitle descriptor is included in a Program Map Table (PMT), a Virtual Channel Table (VCT), or a Service Description Table (SDT).

4. The 3D broadcast receiver of claim 1, wherein the signaling data processor parses maximum disparity information indicating a greatest disparity value for 3D images of the identified 3D view by the first 3D view identification information and minimum disparity information indicating a lowest disparity value for the 3D images of the identified 3D view by the first 3D view identification information.

5. The 3D broadcast receiver of claim 4, wherein the 3D broadcast information processor calculates an On Screen Display (OSD disparity value for displaying an OSD in the 3D images of the identified 3D view by the first 3D view identification information.

6. The 3D broadcast receiver of claim 5, wherein the OSD disparity value is calculated by selecting a smallest disparity value among the disparity values indicating minimum disparity information of the 3D images of the identified 3D view by the first 3D view identification information.

7. The 3D broadcast receiver of claim 1, wherein when the subtitle type information indicates that subtitle bit map data of the subtitle data applied to the 3D images of the identified 3D view by the first 3D view identification information is the same with subtitle bit map data of subtitle data for a 2-dimensional (2D) broadcast image but disparity data of the subtitle data applied to the 3D images of the identified 3D view by the first 3D view identification information is different from predefined disparity data, the subtitle stream identification information identifies a subtitle stream transmitting the disparity data of the subtitle data applied to the 3D images of the identified 3D view by the first 3D view identification information and the subtitle segment identification information identifies a segment transmitting the disparity data of the subtitle data applied to the 3D images of the identified 3D view by the first 3D view identification information.

8. The 3D broadcast receiver of claim 1, wherein when the subtitle type information indicates that subtitle bit map data and disparity data of the subtitle data applied to the 3D images of the identified 3D view by the first 3D view identification information are different from subtitle bit map data of subtitle data for a 2-dimensional (2D) broadcast image and predefined disparity data, the subtitle stream identification information identifies a subtitle stream transmitting the subtitle data applied to the 3D images of the identified 3D view by the first 3D view identification information and the subtitle segment identification information identifies a segment transmitting 3D images of the identified 3D view by the first 3D view identification information.

9. A method for processing a multiview 3-dimensional (3D) broadcast image, comprising:

a step of receiving a broadcast signal, wherein the broadcast signal includes a plurality of video streams including a plurality of video data acquired by a plurality of cameras photographing a single subject from different positions, a subtitle stream including subtitle data and a program map table (PMT) for signaling the plurality of video streams and the subtitle data, wherein a plurality of 3D views for viewers in different locations are provided by rendering two video data among the plurality of video data according to a multiview descriptor in the PMT, and wherein a 3D view of the plurality of 3D views consists of one of the two video data as a left image and the other one of the two video data as a right image;

a step of parsing the multiview descriptor describing information on the plurality of video streams from a stream level of the PMT, wherein the multiview descriptor includes 3D views number information indicating the number of 3D views consisting of video data in a video stream of the plurality of video streams, first 3D view identification information identifying a 3D view consisting of the video data in the video stream, left-right information identifying whether the video data in the video stream is rendered as a left image or a right image in the identified 3D view, camera identification information identifying a camera used for acquiring other video data constituting the identified 3D view with the video data in the video stream and disparity information indicating a disparity range of 3D images of the identified 3D view, wherein the signaling data processor further parses a multiview service descriptor describing common information on a 3D service providing the plurality of the 3D views from a program level of the PMT, wherein the multiview service descriptor includes information indicating the number of 3D views provided in the 3D service, information indicating an arrangement type of cameras providing the 3D service, information indicating a viewing angle which the cameras support to provide the 3D service, and information indicating a distance from an intermediate point between the cameras to the single subject, wherein the arrangement type of cameras corresponds to a circular convergent type, a linear convergent type, or a linear parallel type, wherein the step of parsing further parses a multiview subtitle descriptor describing subtitle information on a program provided by the plurality of video streams, and wherein the multiview subtitle descriptor includes number 3D views information indicating the number of 3D views provided in the program, a second 3D view identification information identifying a 3D view provided in the program, subtitle type information indicating a type of the subtitle data in the subtitle stream applied to the identified 3D view by the second 3D view identification information, subtitle stream identification information identifying the subtitle stream applied to the identified 3D view by the second 3D view identification information and subtitle segment identification information identifying a subtitle segment transmitting the subtitle data applied to the identified 3D view by the second 3D view identification information;

a step of applying the subtitle data transmitted in the identified subtitle segment to the 3D images of the identified 3D view by the first 3D view identification information, wherein the identified subtitle segment is transmitted in the identified subtitle stream, and wherein the first 3D view identification information and the second 3D view identification information have the same value; and a step of outputting the 3D images of the identified 3D view by the first 3D view identification information with the subtitle data applied to the 3D images.

10. The method of claim 9, wherein when the subtitle type information indicates that the subtitle data is additional subtitle data in addition to subtitle data for a 2-dimensional (2D) broadcast image, and wherein the subtitle stream identification information identifies a subtitle stream transmitting the additional subtitle data and the subtitle segment identification information identifies a segment transmitting the additional subtitle data.

11. The method of 9, wherein the multiview subtitle descriptor is included in a Program Map Table (PMT), a Virtual Channel Table (VCT), or a Service Description Table (SDT).

12. The method of claim 9, further comprising:

a step of parsing maximum disparity information indicating a greatest disparity value for 3D images of the identified 3D view by the first 3D view identification information and minimum disparity information indicating a lowest disparity value for the 3D images of the identified 3D view by the first 3D view identification information.

13. The method of claim 5, further comprising:

a step of calculating an On Screen Display (OSD) disparity value for displaying an OSD in the 3D images of the identified 3D view by the first 3D view identification information.

14. The method of claim 13, wherein the OSD disparity value is calculated by selecting a smallest disparity value among the disparity values indicating minimum disparity information of the 3D images of the identified 3D view by the first 3D view identification information.

15. The method of claim 9, wherein when the subtitle type information indicates that subtitle bit map data of the subtitle data applied to the 3D images of the identified 3D view by the first 3D view identification information is the same with subtitle bit map data of subtitle data for a 2-dimensional (2D) broadcast image but disparity data of the subtitle data applied to the 3D images of the identified 3D view by the first 3D view identification information is different from predefined disparity data, the subtitle stream identification information identifies a subtitle stream transmitting the disparity data of the subtitle data applied to the 3D images of the identified 3D view by the first 3D view identification information and the subtitle segment identification information identifies a segment transmitting the disparity data of the subtitle data applied to the 3D images of the identified 3D view by the first 3D view identification information.

16. The method of claim 9, wherein when the subtitle type information indicates that subtitle bit map data and disparity data of the subtitle data applied to the 3D images of the identified 3D view by the first 3D view identification information are different from subtitle bit map data of subtitle data for a 2-dimensional (2D) broadcast image and predefined disparity data, the subtitle stream identification information identifies a subtitle stream transmitting the subtitle data applied to the 3D images of the identified 3D view by the first 3D view identification information and the subtitle segment identification information identifies a segment transmitting the 3D images of the identified 3D view by the first 3D view identification information.

* * * * *